US007480504B2

United States Patent
Goulet et al.

(10) Patent No.: US 7,480,504 B2
(45) Date of Patent: Jan. 20, 2009

(54) METHOD AND SYSTEM TO COMPENSATE FOR FAILED NETWORK ACCESS USING DISPARATE ACCESS TECHNOLOGIES

(75) Inventors: Walter P. Goulet, Chicago, IL (US); Luis G. Rodriguez Chiappetta, Cary, IL (US)

(73) Assignee: Motorola, Inc., Schaumburg, IL (US)

( * ) Notice: Subject to any disclaimer, the term of this patent is extended or adjusted under 35 U.S.C. 154(b) by 311 days.

(21) Appl. No.: 11/421,312

(22) Filed: May 31, 2006

(65) Prior Publication Data

US 2007/0281683 A1 Dec. 6, 2007

(51) Int. Cl.
*H04Q 7/20* (2006.01)

(52) U.S. Cl. ........... 455/423; 455/426.1; 455/432.1; 455/436; 455/435.1; 455/435.2; 455/552

(58) Field of Classification Search ............ 455/423, 455/426.1, 550.1, 91; 370/338, 331, 466
See application file for complete search history.

(56) References Cited

U.S. PATENT DOCUMENTS

| 2004/0203873 | A1* | 10/2004 | Gray ............. 455/456.1 |
| 2005/0172288 | A1 | 8/2005 | Ahuja et al. |
| 2005/0226185 | A1* | 10/2005 | Tell et al. ............. 370/331 |
| 2005/0282575 | A1* | 12/2005 | Dorenbosch ........... 455/550.1 |
| 2006/0039332 | A1* | 2/2006 | Kotzin ................ 370/338 |
| 2007/0026818 | A1* | 2/2007 | Willins et al. ......... 455/91 |
| 2007/0076662 | A1 | 4/2007 | Jain et al. |

OTHER PUBLICATIONS

Patent Cooperation Treaty, "International Search Report and Written Opinion" ISA/US, by Officer Bost Dwayne in PCT Application No. PCT/US07/64928; Document of 6 pages dated Aug. 5, 2008.

* cited by examiner

*Primary Examiner*—David Q Nguyen

(57) ABSTRACT

A wireless communication system (100) or method (300) to compensate for failed network access using disparate access technologies can include an access point controller (109) for a first wireless access technology (such as wireless local area network) coupled to a wide area base receiver (106) for a second wireless access technology (such as a wireless cellular network) and a processor (150) forming a portion of the access point controller. The processor can be programmed to monitor the first wireless access technology for wireless access failures and automatically instruct the second wireless access technology to compensate for the wireless access failures of the first wireless access technology. The processor can automatically instruct by instructing the wide area base receiver to compensate for a failure of first wireless access technology or by instructing the wide area base receiver to increase cellular coverage in areas specified by the access point controller.

15 Claims, 3 Drawing Sheets

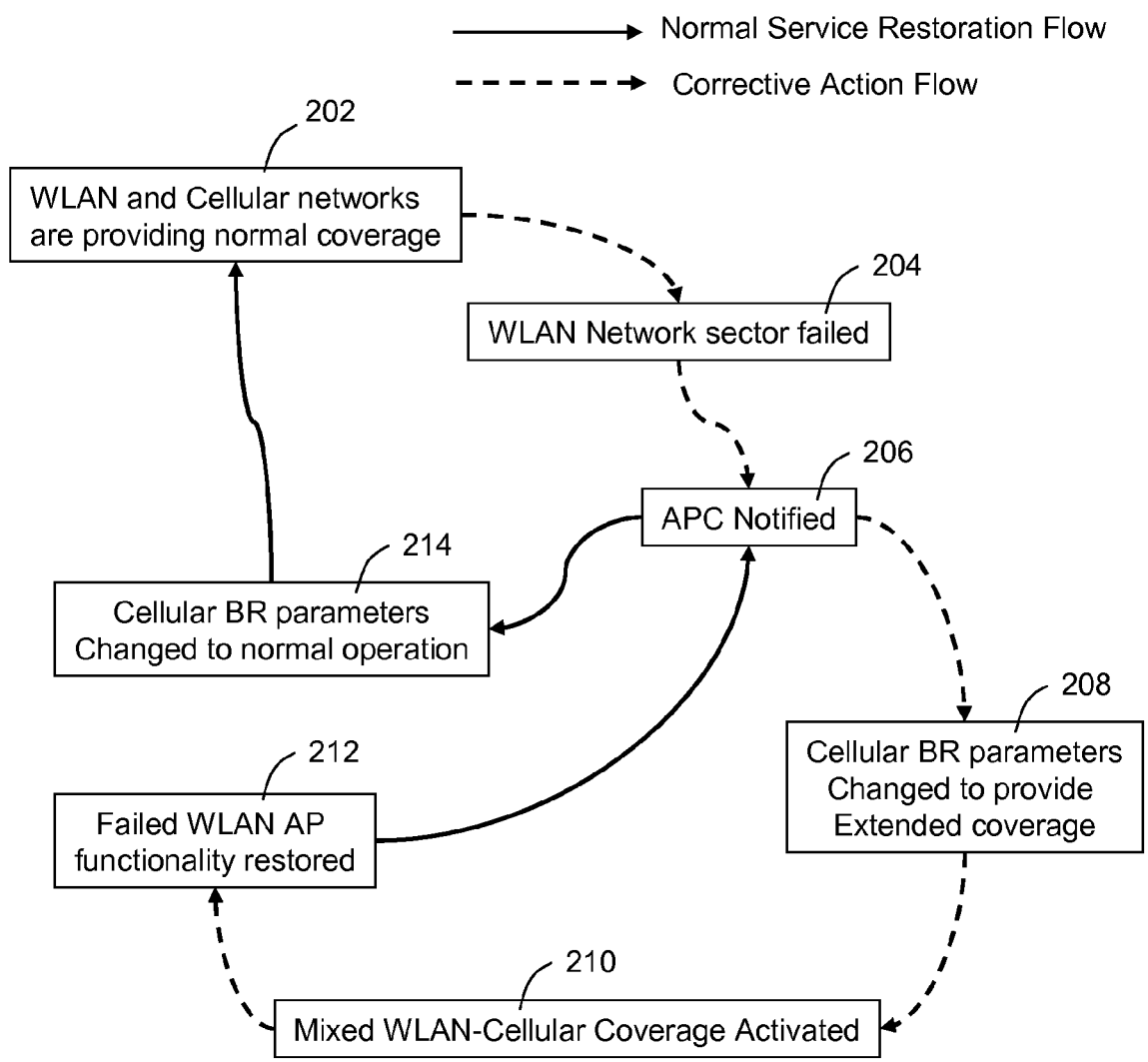

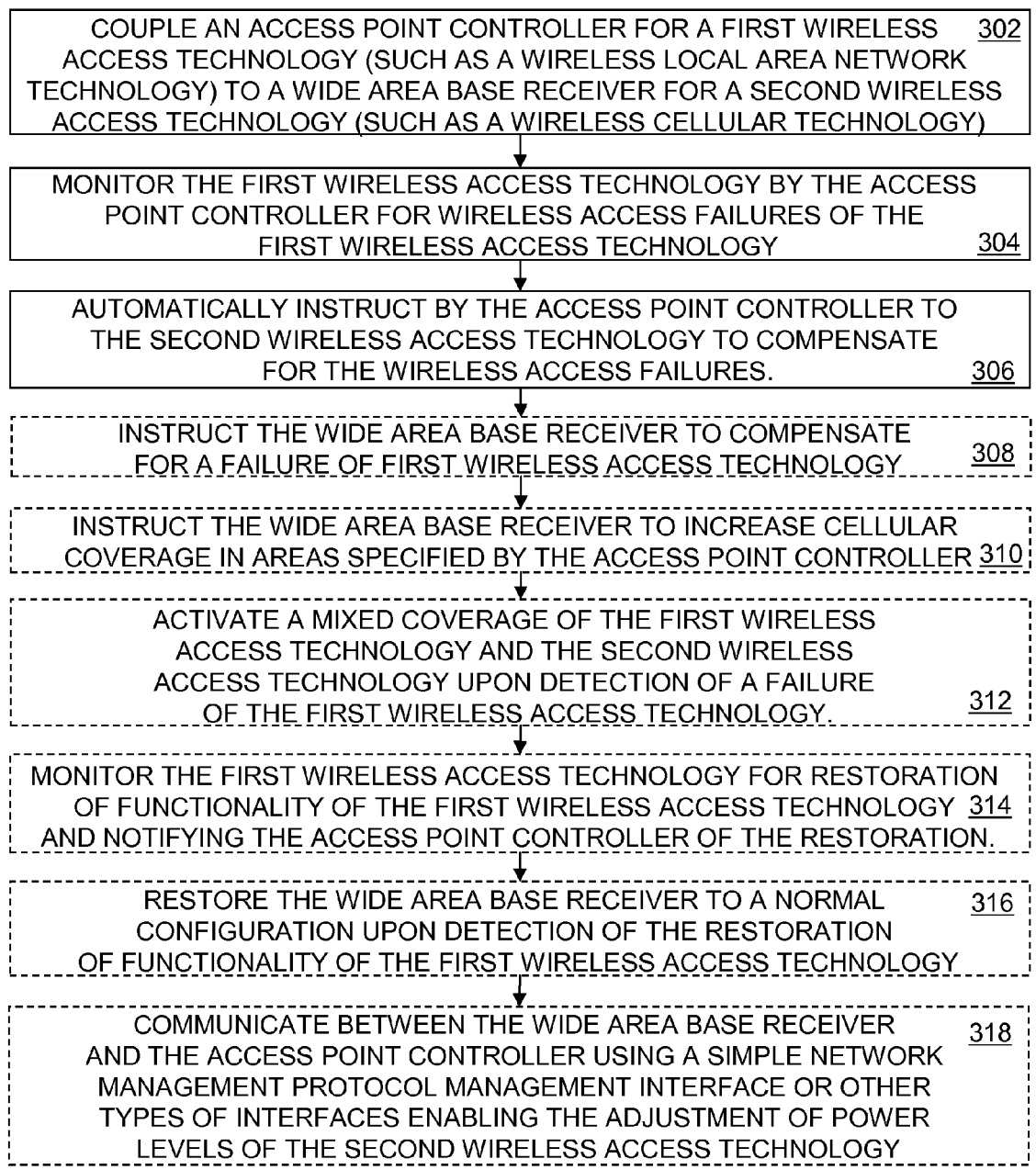

METHOD AND SYSTEM TO COMPENSATE FOR FAILED NETWORK ACCESS USING DISPARATE ACCESS TECHNOLOGIES

FIELD

This invention relates generally to communication systems and methods, and more particularly to a system and method for compensating for failed network access using disparate access technologies.

BACKGROUND

Existing enterprise seamless mobility solutions rely on wireless local area network (WLAN) access points to provide service to mobile communication devices or mobiles. If a mobile is unable to access the WLAN network, the mobile will switch to the cellular network to provide service. In case a WLAN access point fails, the mobile will either attempt to locate another WLAN access point to associate with or connect to the cellular network. In the event a large block of contiguous WLAN access points fail, the mobile will be forced to connect to the cellular network, regardless of the signal quality. Even with a dedicated "mini cell site" provided by a mobile carrier, the mobile may have poor connectivity to the cellular network since the mini cell site provides blanket coverage to the enterprise. Currently, the only way the improve performance using the dedicated cell site would be to notify the cellular carrier or provider of the WLAN access point failures and enable the cellular carrier to manually adjust parameters of the cell site to improve coverage and performance.

SUMMARY

Embodiments in accordance with the present invention can provide automated configuration of a mini cell site to provide enhanced coverage to an area where many WLAN access points have failed. Such arrangement can enable a mobile subscriber to enjoy a better signal and possibly not even notice the failure of the WLAN network making the experience seamless.

In a first embodiment of the present invention, a method to compensate for failed network access using disparate access technologies can include coupling an access point controller for a first wireless access technology (such as a wireless local area network technology) to a wide area base receiver for a second wireless access technology (such as a wireless cellular technology), monitoring the first wireless access technology by the access point controller for wireless access failures of the first wireless access technology, and automatic instructing by the access point controller to the second wireless access technology to compensate for the wireless access failures. Automatic instructing can involve instructing the wide area base receiver to compensate for a failure of first wireless access technology or instructing the wide area base receiver to increase cellular coverage in areas specified by the access point controller. The method can further include the step of activating a mixed coverage of the first wireless access technology and the second wireless access technology upon detection of a failure of the first wireless access technology. The method can also include the step of monitoring the first wireless access technology for restoration of functionality of the first wireless access technology and notifying the access point controller of the restoration. The method can restore the wide area base receiver to a normal configuration upon detection of the restoration of functionality of the first wireless access technology. The method can also include communicating between the wide area base receiver and the access point controller using management protocols such as $3^{rd}$ Generation Partnership Project (3GPP) or Simple Network Management Protocol (SNMP) management protocols via a North Bound management interface or other interfaces enabling the adjustment of power levels of the second wireless access technology. Note, "compensating" for failed network access can involve a wide variety of compensation schemes including increased power or coverage, lower data rates, higher data rates, and directional beam forming of antennas just to name a few examples.

In a second embodiment of the present invention, a wireless communication system to compensate for failed network access using disparate access technologies can include an enterprise communication system having an access point controller for a first wireless access technology (such as wireless local area network) coupled to a wide area base receiver for a second wireless access technology (such as a wireless cellular network) and a processor forming a portion of the access point controller. The processor can be programmed to monitor the first wireless access technology for wireless access failures and automatically instruct the second wireless access technology to compensate for the wireless access failures of the first wireless access technology. The processor can automatically instruct by instructing the wide area base receiver to compensate for a failure of first wireless access technology or by instructing the wide area base receiver to increase cellular coverage in areas specified by the access point controller. The processor can also be programmed to activate a mixed coverage of the first wireless access technology and the second wireless access technology upon detection of a failure of the first wireless access technology. The processor can also be programmed to monitor the first wireless access technology for restoration of functionality of the first wireless access technology and notify the access point controller of the restoration. The processor can then restore the wide area base receiver to a normal configuration upon detection of the restoration of functionality of the first wireless access technology. The processor can also be programmed to communicate between the wide area base receiver and the access point controller using management protocols such as 3GPP or SNMP management protocols via a North Bound management interface or other interfaces enabling the adjustment of power levels of second wireless access technology. Note, the wide area base receiver and access point controller can be dedicated for the use of the enterprise communication system and a Service Level Agreement can exist between an enterprise owner of the enterprise communication system and a cellular network carrier enabling the enterprise owner to adjust power levels through the wide area base receiver.

In a third embodiment of the present invention, an access point controller within a wireless communication system using disparate access technologies to compensate for failed network access can include an interface from the access point controller for a first wireless access technology (such as a local area network) to a wide area base receiver for a second wireless access technology (such as a wireless cellular network) and a processor forming a portion of the access point controller. The processor can be programmed to monitor the first wireless access technology for wireless access failures and to automatically instruct the second wireless access technology to compensate for the wireless access failures of the first wireless access technology. The processor can automatically instruct by instructing the wide area base receiver to compensate for a failure of first wireless access technology by increasing cellular coverage in areas specified by the access point controller using management protocols such as 3GPP or SNMP management protocols via a North Bound management interface or other interfaces. The processor can further be programmed to monitor the first wireless access technology for restoration of functionality of the first wireless access technology and to notify the access point controller of the restoration. The processor can also be programmed to restore the wide area base receiver to a normal configuration upon detection of the restoration of functionality of the first wireless access technology.

The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically.

The terms "program," "software application," and the like as used herein, are defined as a sequence of instructions designed for execution on a computer system. A program, computer program, or software application may include a subroutine, a function, a procedure, an object method, an object implementation, an executable application, an applet, a servlet, a source code, an object code, a shared library/dynamic load library and/or other sequence of instructions designed for execution on a computer system. The term "wireless access technology" can mean any wireless data communication and a "wireless access failure" can be any type of failure interrupting the flow of information to (or from) a communication device using the wireless access technology.

Other embodiments, when configured in accordance with the inventive arrangements disclosed herein, can include a system for performing and a machine readable storage for causing a machine to perform the various processes and methods disclosed herein.

BRIEF DESCRIPTION OF THE DRAWINGS

FIG. 2 is a flow chart of the operation of a system as illustrated in FIG. 1 in accordance with another embodiment of the present invention.

FIG. 3 is a flow chart of a method to compensate for failed network access using disparate access technologies in accordance with an embodiment of the present invention.

DETAILED DESCRIPTION OF THE DRAWINGS

Figure 1:
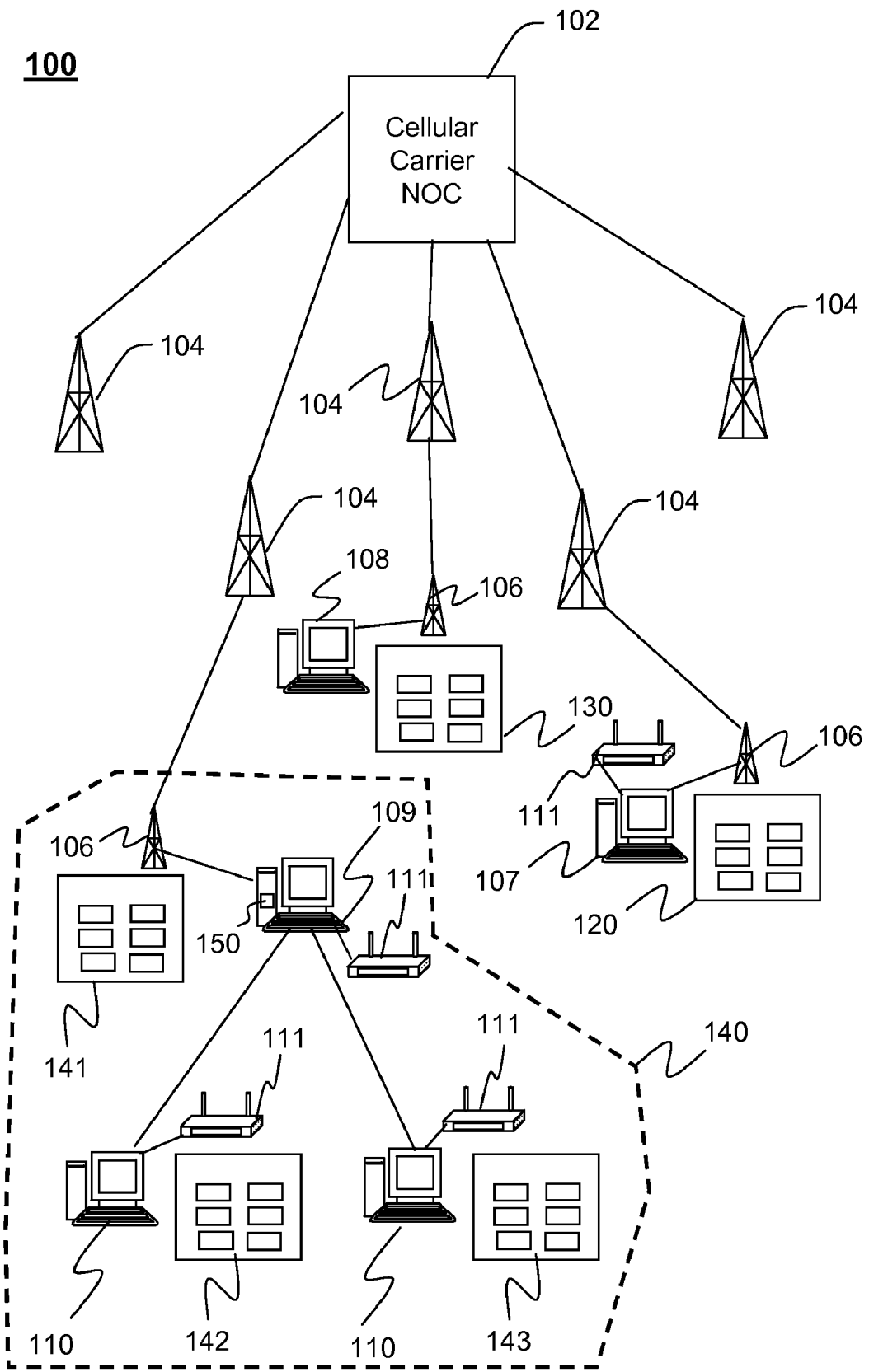
FIG. 1 is an illustration of an a wireless communication system to compensate for failed network access using disparate access technologies in accordance with an embodiment of the present invention.

While the specification concludes with claims defining the features of embodiments of the invention that are regarded as novel, it is believed that the invention will be better understood from a consideration of the following description in conjunction with the figures, in which like reference numerals are carried forward.

Embodiments herein can be implemented in a wide variety of exemplary ways to automatically compensate for failed access points such as WLAN access points by adjusting cellular network coverage to compensate for failed WLAN access points. Such a system can require minimal changes to existing off the shelf components in a communication system.

Referring to FIG. 1, a communication system 100 in accordance with an embodiment herein can integrate various components and leverage existing management protocols to enable an enterprise seamless mobility (ESM) solution using WLAN access points and a cellular network for example. Embodiments herein can automate previously manual operations that previously required an enterprise network operator to contact a cellular network operator by phone or in another manner to report problems to enable the cellular network operator to make adjustments. Whereas, here, cellular network adjustments can be performed automatically.

More particularly, the communication system 100 can include a hybrid system where an enterprise 120, 130 or 140 can each have their own local area networks each having their own access point controllers 107, 108 or 109 respectively and wireless LAN routers or hubs 111 for example. Each of the access point controllers can interface or be coupled to a "mini cell site" or base receiver 106 operated by a cellular operator and controlled by a cellular carrier network operating center (NOC) 102. The base receiver can be part of a network of base stations 104 that form part of the cellular network controlled by the NOC 102. In the case of enterprise 140, the access point controller 109 can be a master access point controller at an enterprise site 141 linked and controlling slave access point controller 110 at different enterprise sites 142 and 143 of the enterprise 140.

In one example using the hybrid communication system 100, the enterprise 140 may have contracted with the cellular operator operating the NOC 102 to obtain a dedicated mini-base receiver or "mini-BR" 106 for improved cellular coverage. In this deployment, the enterprise customer (140) can configure the mini-BR 106 so that it is partially managed by an access point network manager using the access point controller 109. Then, when a portion of the local area network fails, the access point network manager can automatically reconfigure the mini-BR106 to compensate for the failed access points (111). How the base receiver is set to compensate for the failed access points can vary based on the configuration of the access points and the base receiver. The access point controller 109 (or other access point controllers in the system) can include a processor 150 that performs one or more functions described below. The processor in this regard can be any suitable component or combination of components, including any suitable hardware or software, capable of executing the processes described in relation to the inventive arrangements herein.

Referring to FIG. 2, an operational flow diagram 200 demonstrates how a corrective action flow and a normal service restoration flow for a communication system (such as system 100 of FIG. 1) can progress in accordance with an embodiment of the invention. At step 202, a WLAN and cellular network is providing normal coverage. If a significant WLAN access point failure occurs such as a WLAN sector failure at step 204, then the accept point controller is notified with an access point failure alert at step 206. The access point controller can instruct and adjust a cellular base receiver's parameters to compensate for the WLAN access point failure(s) and can provide extended coverage at step 208. The cellular base receiver can increase coverage or power in areas specified by the access point controller in activating and providing a mixed WLAN-Cellular coverage environment at step 210.

If and when the failed WLAN access points are repaired or restored at step 212, the access point controller is again notified of such status at step 206. The access point controller can then instruct the cellular base receiver (as well as other access points or access point controllers) to change back to normal operation at step 214 in a return to "normal" operation at step 202.

There are several assumptions that can be made about the system 100 and process flow 200. For example, a cellular network operator may provide a dedicated base receiver (BR) to provide cellular coverage for a particular enterprise. The dedicated cellular network BR can provide an interface such as a SNMP management interface to the enterprise that can be used to adjust power levels or other parameters. The access point controller (APC) is typically owned by the enterprise and is used to manage their wireless network. Multiple APCs may be required for large enterprises as is illustrated by the enterprise 140 in FIG. 1. Furthermore, a Service Level Agreement (SLA) between the Enterprise and the cellular network provider can specify that the enterprise has authority over the operator to adjust BR power levels. Although no new components are necessarily needed to implement the embodiments herein, a WLAN APC to Cellular base receiver interface may be integrated or fashioned from software elements or tools available.

Embodiments can come in the form of a new WLAN management solution that can include an interface that implements the methods disclosed and present an opportunity to offer consulting services and service level agreements between enterprise customers and the cellular network operators used by the enterprise. Furthermore, there is the potential to create a cellular network BR (or mini cell site) for enterprises that is capable of being managed by a WLAN management solution.

Referring to FIG. 3, a flow chart illustrating a method 300 to compensate for failed network access using disparate access technologies is shown. The method 300 can include the step 302 of coupling an access point controller for a first wireless access technology (such as a wireless local area network technology) to a wide area base receiver for a second wireless access technology (such as a wireless cellular technology), monitoring the first wireless access technology by the access point controller for wireless access failures of the first wireless access technology at step 304, and automatic instructing by the access point controller to the second wireless access technology to compensate for the wireless access failures at step 306. Automatic instructing can optionally involve instructing the wide area base receiver to compensate for a failure of the first wireless access technology at step 308 or instructing the wide area base receiver to increase cellular coverage in areas specified by the access point controller at step 310. The method 300 can further include the step 312 of activating a mixed coverage of the first wireless access technology and the second wireless access technology upon detection of a failure of the first wireless access technology. The method 300 can also include the step 314 of monitoring the first wireless access technology for restoration of functionality of the first wireless access technology and notifying the access point controller of the restoration. The method 300 can restore the wide area base receiver to a normal configuration upon detection of the restoration of functionality of the first wireless access technology at step 316. The method 300 can also include communicating between the wide area base receiver and the access point controller using a SNMP or 3GPP management interface or other types of interfaces enabling the adjustment of power levels of the second wireless access technology at step 318.

In light of the foregoing description, it should be recognized that embodiments in accordance with the present invention can be realized in hardware, software, or a combination of hardware and software. A network or system according to the present invention can be realized in a centralized fashion in one computer system or processor, or in a distributed fashion where different elements are spread across several interconnected computer systems or processors (such as a microprocessor and a DSP). Any kind of computer system, or other apparatus adapted for carrying out the functions described herein, is suited. A typical combination of hardware and software could be a general purpose computer system with a computer program that, when being loaded and executed, controls the computer system such that it carries out the functions described herein.

In light of the foregoing description, it should also be recognized that embodiments in accordance with the present invention can be realized in numerous configurations contemplated to be within the scope and spirit of the claims. Additionally, the description above is intended by way of example only and is not intended to limit the present invention in any way, except as set forth in the following claims.

What is claimed is:

1. A method to compensate for failed network access using disparate access technologies, comprising the steps of:
    coupling an access point controller for a first wireless access technology to a wide area base receiver for a second wireless access technology;
    monitoring the first wireless access technology by the access point controller for wireless access failures of the first wireless access technology;
    automatic instructing by the access point controller to the second wireless access technology to compensate for the wireless access failures;
    monitoring the first wireless access technology for restoration of functionality of the first wireless access technology and notifying the access point controller of the restoration;
    restoring the wide area base receiver to a normal configuration upon detection of the restoration of functionality of the first wireless access technology; and
    wherein the first wireless access technology is a wireless local area network technology and the second wireless access technology is wireless cellular technology.

2. The method of claim 1, wherein a wireless local area network technology failure is compensated by the wireless cellular technology.

3. The method of claim 1, wherein the step of automatic instructing comprises the step of instructing the wide area base receiver of the second wireless technology to compensate for a failure of first wireless access technology.

4. The method of claim 1, wherein the step of automatic instructing comprises instructing the wide area base receiver of the second wireless technology to increase cellular coverage in areas specified by the access point controller.

5. The method of claim 1, wherein the method further comprises the step of activating a mixed coverage of the first wireless access technology and the second wireless access technology upon detection of a failure of the first wireless access technology.

6. The method of claim 1, wherein the method further comprises communicating between the wide area base receiver and the access point controller using management protocols among 3GPP and SNMP via a management interface enabling the adjustment of power levels of the second wireless access technology.

7. A wireless communication system to compensate for failed network access using disparate access technologies, comprising:

an enterprise communication system having an access point controller for a first wireless access technology coupled to a wide area base receiver for a second wireless access technology;

a processor forming a portion of the access point controller, wherein the processor is programmed to:

monitor the first wireless access technology for wireless access failures;

automatically instruct the second wireless access technology to compensate for the wireless access failures of the first wireless access technology;

monitor the first wireless access technology for restoration of functionality of the first wireless access technology and notifying the access point controller of the restoration restore the wide area base receiver to a normal configuration upon detection of the restoration of functionality of the first wireless access technology and wherein the first wireless access technology is a wireless local area network technology and the second wireless access technology is wireless cellular technology.

8. The system of claim 7, wherein a wireless local area network failure is compensated by wireless cellular network.

9. The system of claim 7, wherein the processor automatically instructs by instructing the wide area base receiver of the second wireless access technology to compensate for a failure of first wireless access technology.

10. The system of claim 7, wherein the processor automatically instructs by instructing the wide area base receiver of the second wireless access technology to increase cellular coverage in areas specified by the access point controller.

11. The system of claim 7, wherein the processor further activates a mixed coverage of the first wireless access technology and the second wireless access technology upon detection of a failure of the first wireless access technology.

12. The system of claim 7, wherein the processor is further programmed to communicate between the wide area base receiver and the access point controller using management protocols among 3GPP and SNMP via a management interface enabling the adjustment of power levels of second wireless access technology.

13. The system of claim 7, wherein the wide area base receiver and access point controller is dedicated for the use of the enterprise communication system and a Service Level Agreement exists between an enterprise owner of the enterprise communication system and a cellular network carrier enabling the enterprise owner to adjust power levels through the wide area base receiver of the cellular network.

14. An access point controller within a wireless communication system using disparate access technologies to compensate for failed network access, comprising:

an interface from the access point controller for a first wireless access technology to a wide area base receiver for a second wireless access technology;

a processor forming a portion of the access point controller, wherein the processor is programmed to:

monitor the first wireless access technology for wireless access failures;

automatically instruct the second wireless access technology to compensate for the wireless access failures of the first wireless access technology;

monitor the first wireless access technology for restoration of functionality of the first wireless access technology and notifying the access point controller of the restoration restore the wide area base receiver to a normal configuration upon detection of the restoration of functionality of the first wireless access technology and wherein the first wireless access technology is a wireless local area network technology and the second wireless access technology is wireless cellular technology.

15. The access point controller of claim 14, wherein the first wireless access technology is a wireless local area network and the second wireless access technology is wireless cellular network and processor automatically instructs by instructing the wide area base receiver to compensate for a failure of first wireless access technology by increasing cellular coverage in areas specified by the access point controller using management protocols among 3GPP and SNMP via a management interface.

\* \* \* \* \*